UNITED STATES PATENT OFFICE.

EDMUND BEDFORD, OF REDLANDS, AND LYMAN N. BEDFORD, OF SAN BERNARDINO, CALIFORNIA.

PROCESS OF PRESERVING FRESH RIPE OLIVES.

No. 860,185.                    Specification of Letters Patent.          Patented July 16, 1907.

Application filed February 11, 1903. Serial No. 142,981.

*To all whom it may concern:*

Be it known that we, EDMUND BEDFORD, a citizen of the United States, residing at Redlands, in the county of San Bernardino and State of California, and LYMAN N. BEDFORD, a citizen of the United States, residing at San Bernardino, in said county and State, have invented a new and useful Process of Preserving Fresh Ripe Olives, of which the following is a specification.
Heretofore, as far as we are aware, there has never been any method known whereby it is commercially practicable to preserve fresh ripe olives a definite time in their native condition. It frequently occurs that at the time of harvesting ripe olives it is difficult and sometimes impracticable to take care of the entire crop while the olives are in prime condition.

An object of this invention is to make it possible to preserve the fresh ripe olives in their native condition for an indefinite time, extending over a period of many months out of the olive season and even years, without deterioration, leaving the fruit in fresh condition to at any time be put through the processes which fresh ripe olives are usually put to fit them for use as food. We have discovered that this desirable result is attained by a very simple, novel and inexpensive method which we will now describe.

Our newly discovered method or process of preserving olives consists in submerging the newly picked fresh ripe olives in water and maintaining the water at a temperature at which internal changes of the olives do not take place, namely, at a temperature ranging from about 32° Fahrenheit for a most effective preservation, to a possible temperature of about 50° Fahrenheit, at which temperature any serious deterioration of the fruit will be prevented for a period of several months, so far as our experiments have demonstrated. At the lower temperature stated, we have been able to keep olives without apparent change for a period of eight months.
In carrying out our invention, the olives will be allowed to come to the desired degree of ripeness and will then be picked and while fresh and in their natural state will be placed in tanks or other suitable receptacles which are constructed for carrying on or maintaining a refrigeration of the contents of the tanks; or any desirable means may be provided for producing and maintaining a desired low temperature of the contents of the tanks or other receptacles. Said receptacles will be sufficiently filled with water to entirely submerge the charge of olives and the olives will be thus kept submerged and at the requisite low temperature stated to preserve them until the time for preparing the same for market out of the olive season in which they were picked arrives. The olives will then be removed in requisite quantities from the tanks or other receptacles at any appropriate time and treated in the usual way for preparing the same for market.

In carrying out our process, we have at times maintained the refrigeration of the mass of water and olives at a temperature of about 32° Fahrenheit without congealing the water and our experiments have indicated that as this degree is approximated, the perfection of preservation is attained.

It is to be understood that this novel method may include an introduction of the olives while at a low temperature into a body of water of low temperature and maintaining a low temperature as required; and that different means whereby the submerged olives are held at a low temperature may be employed.

Now having described our invention, what we claim as new and desire to secure by Letters-Patent of the United States is:—

1. The art of supplying fresh ripe olives for use out of the ripe olive season which consists in picking ripe olives in the olive season and submerging the same while fresh in water, maintaining the mass of olives and water at a temperature from thirty-two to fifty degrees Fahrenheit to a period when wanted out of the ripe olive season and then removing the olives and preparing them for use.

2. In the art of supplying fresh ripe olives for use out of the olive season, the steps set forth which consist in picking ripe olives from the tree in the olive season and submerging the same, while fresh, in water and refrigerating the mass of olives and water to keep the same at a temperature below fifty degrees Fahrenheit until a period out of the olive season.

3. The method set forth of preserving fresh ripe olives which consists in submerging fresh ripe olives in water and keeping the same at a temperature below fifty degrees Fahrenheit, at which internal changes of the olives do not take place, and thus keeping the olives to a period out of the ripe olive season.

In testimony whereof, we have signed our names to this specification in the presence of two subscribing witnesses, at Redlands in the county of San Bernardino and State of California, this 12th day of May, 1903.

EDMUND BEDFORD.
LYMAN N. BEDFORD.

Witnesses:
CHAS. E. TRUESDELL,
AUGUSTA SASSON.